C. KRATT.
HEATING APPARATUS.
APPLICATION FILED SEPT. 29, 1913.
1,095,405.
Patented May 5, 1914.
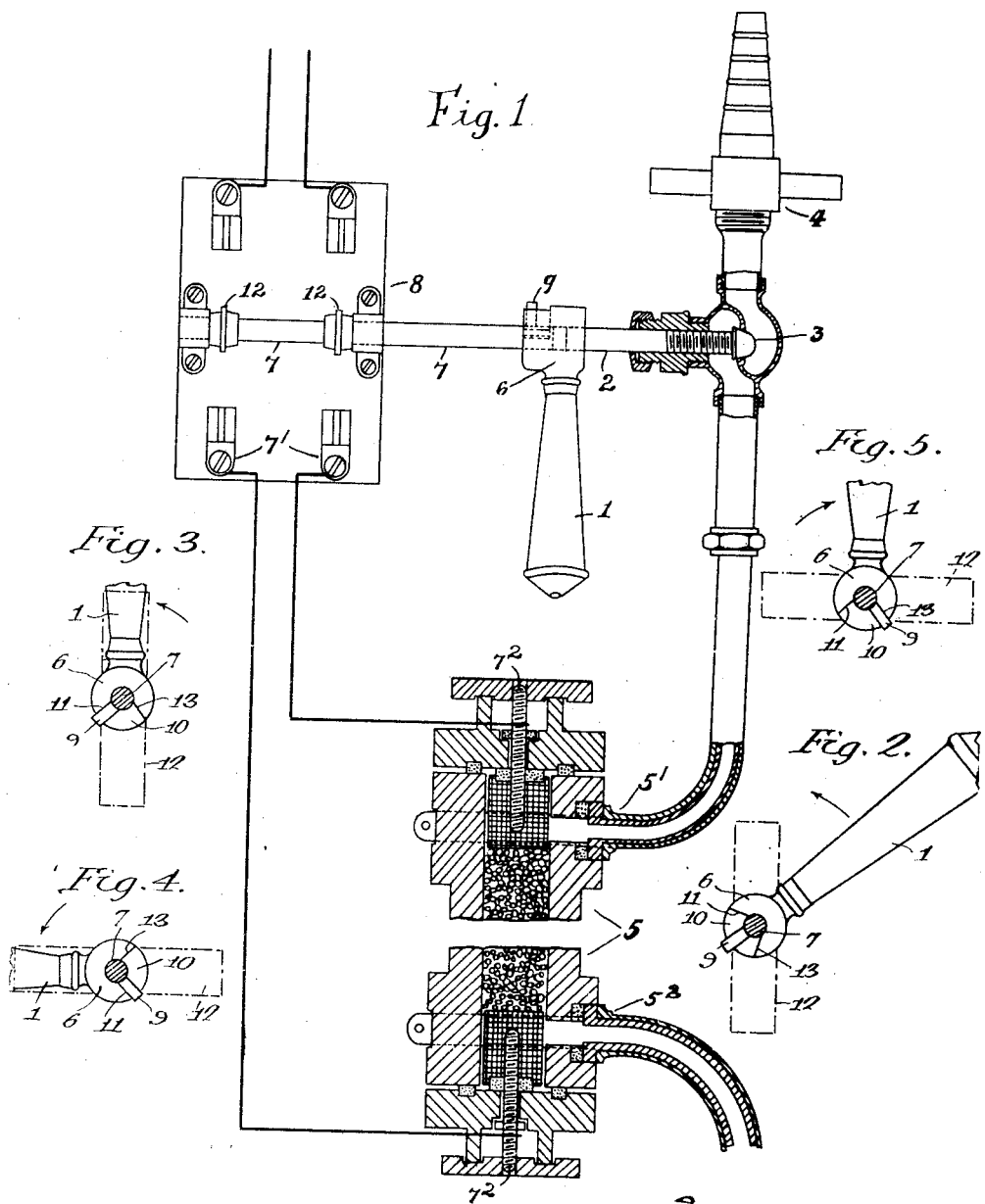
Witnesses
J. B. McGuire
Hugo B Polson
Inventor
Charles Kratt
by Kerr Page Cooper & Hayward,
his attorneys.

UNITED STATES PATENT OFFICE.

CHARLES KRATT, OF GLASGOW, SCOTLAND.

HEATING APPARATUS.

1,095,405.  Specification of Letters Patent.  Patented May 5, 1914.

Application filed September 29, 1913. Serial No. 792,303.

*To all whom it may concern:*

Be it known that I, CHARLES KRATT, a subject of the King of the United Kingdom of Great Britain and Ireland, and residing at Glasgow, Scotland, have invented a certain new and useful Improvement in Heating Apparatus, of which the following is a specification.

This invention relates to apparatus for heating liquids electrically including a geyser or the like having an inlet and an outlet for liquid and containing an electrical resistance (*e. g.* granules of carbon); and it has for its object to provide in such apparatus coacting means for controlling the supply of liquid and the flow of current through the resistance.

In the accompanying drawing Figure 1 is a part vertical section part side elevation showing a general arrangement of apparatus embodying the invention: Figs. 2 to 5 show in different operative positions details of the means for controlling the supply of liquid and the flow of current.

Referring to the drawing, 1 is a manually operable lever secured to the spindle 2 of a valve 3 for controlling the supply of liquid, the casing of which valve is connectible to a liquid supply pipe (not shown) by means of a coupling 4 and also to a container 5 packed with granules of carbon or the like affording an electrical resistance, said container having an inlet 5¹ and outlet 5² for liquid. Coaxial with the boss 6 of the lever 1 and entering freely in said boss is one end of the actuating spindle 7 of an electric switch 8 which controls the flow of current through the carbon resistance. As shown, the said switch is of the double-pole type and its blades 12 are rotatable with the spindle 7. The conductors from the switch are shown at 7¹, and the terminals fitted to the container are shown at 7². The spindle 7 is provided with a radially projecting pin 9 forming one element of a clutch and movable within a sectoral gap or interruption 10 formed in the boss 6 which constitutes the second element of the clutch.

In the operation of the apparatus the lever 1 is moved in counter-clockwise direction from the inoperative position shown in Fig. 2 to the position shown in Fig. 3, so as to open the valve 3 and permit a supply of cold liquid to pass through the container 5. On continued movement of the lever 1 in counter-clockwise direction to the position shown in Fig. 4, the valve 3 is opened farther and a face 11 constituting one wall of the gap or interruption 10 engages the pin 9 so that the spindle 7 is rotated and closes the switch, in consequence of which the electric circuit through the resistance is closed while the valve is fully opened and the liquid flowing through the container is heated to the tepid stage. From the position shown in Fig. 4, the lever 1 may now be moved in clockwise direction to the position shown in Fig. 5 whereby the valve 3 is partially closed without interruption of the circuit, a diminished supply of liquid at an increased temperature being thus obtained. When the lever 1 is in the position shown in Fig. 5, the face 13 constituting another wall of the gap or interruption 10 engages the pin 9, so that on movement of the lever 1 in clockwise direction to initial or inoperative position, Fig. 2, the spindles 7 and 2 are rotated to open the switch and close the valve, a snap-spring, not shown, serving to restore the blades 12 to open position, Fig. 2.

From the foregoing it will be understood that the oscillatory lever 1 constitutes a valve actuator movable in two stages, and that the clutch device serves to transmit movement of said lever 1 to the spindle 7 of the switch only during the second stage of the oscillatory movement of said lever in either direction, such result being obtained by reason that the walls of the gap 10 are spaced apart a distance exceeding the width of the projecting pin 9.

An indicator plate may be provided to indicate the positions into which the lever should be moved according as cold water, tepid water or hot water is wanted.

What I claim is:—

1. In combination with a valve for controlling the flow of liquid, an oscillatory lever movable in two stages for actuating said valve, a switch device for controlling the flow of electric current for heating the liquid and a clutch device adapted to transmit movement of said lever to said switch device only during the second stage of its oscillatory movement in either direction.

2. In combination with a valve for controlling the flow of liquid, a lever fitted on the spindle of said valve, said lever having a boss formed with a sectoral gap, and a switch-actuating spindle disposed coaxially with said valve spindle and having a projection entering said gap, and adapted on movement of said lever to engage one or other of the walls of said gap, the spacing 5 of said walls being greater than the width of said projection.

In testimony whereof I have signed my name to this specification in the presence of two subscribing witnesses.

CHARLES KRATT.

Witnesses:
 WALLACE CRANSTON FAIRWEATHER,
 HENRY MASON.